April 7, 1942.  J. C. SUTTON  2,279,076
WEIGHING SCALE
Filed April 20, 1939
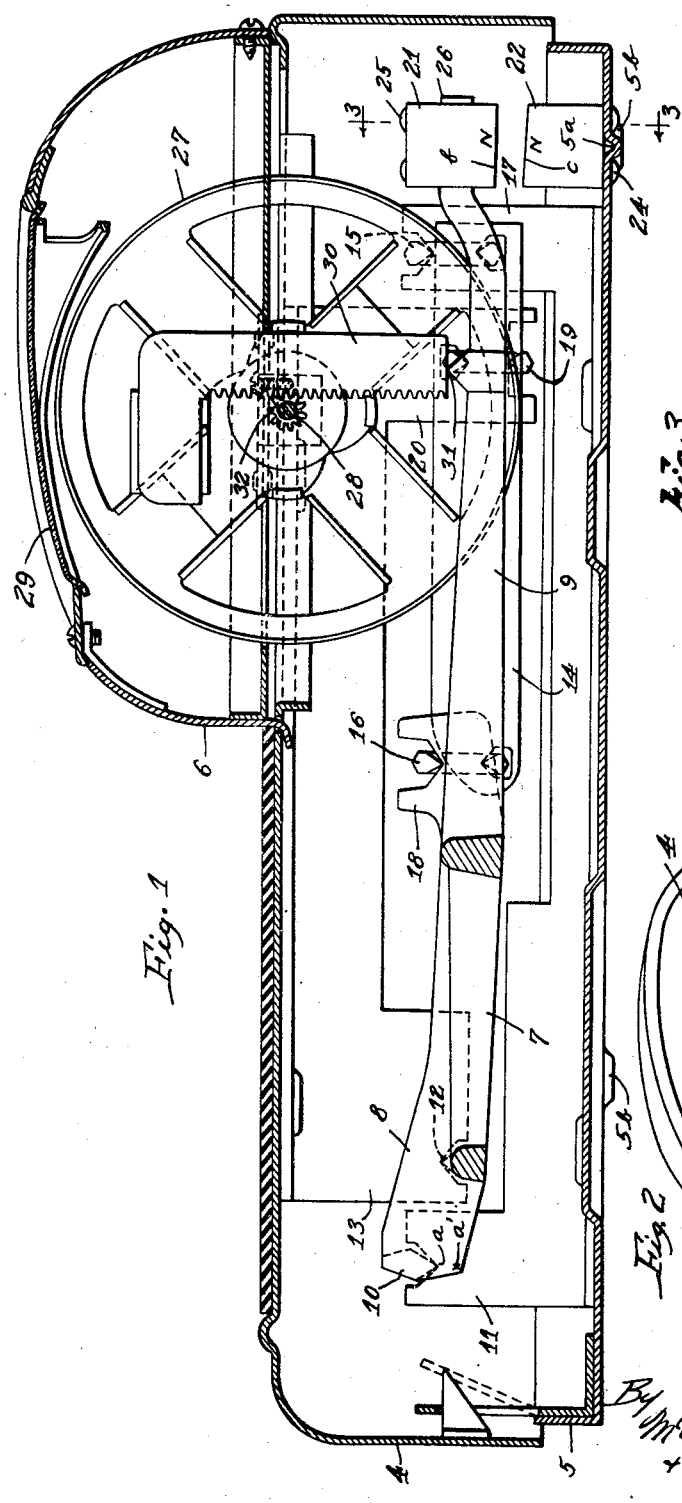
Inventor:
John C. Sutton
By McCanna, Wintercorn
& Morsbach
Attys.

Patented Apr. 7, 1942

2,279,076

UNITED STATES PATENT OFFICE 2,279,076

WEIGHING SCALE

John C. Sutton, Rockford, Ill., assignor to The Brearley Company, Rockford, Ill., a corporation of Illinois Application April 20, 1939, Serial No. 268,959

9 Claims. (Cl. 265—27)

This invention relates to weighing scales, and has particular reference to one especially designed for bathroom use.

Bathroom scales and other weighing scales have generally employed coiled tension springs arranged to be stretched when the platform is loaded, the elongation being measured and indicated in pounds by a suitable dial and pointer. These springs necessitated rather complicated and expensive constructions and were objectionable for other reasons. It is the principal object of my invention to provide a springless scale using the repulsion force of opposed permanent magnets for counterbalancing purposes, whereby to make for a simpler and a generally more satisfactory scale.

The invention is illustrated in the accompanying drawing, in which—

Fig. 1 is a longitudinal section through a bathroom scale embodying my invention, the section being taken on the line 1—1 of Fig. 2;

Fig. 2 is a plan view of the scale, and

Fig. 3 is a sectional detail on the line 3—3 of Fig. 1.

The same reference numerals are applied to corresponding parts throughout the views.

The scale illustrated is generally similar to that disclosed in my copending application Serial No. 214,068, filed June 16, 1938, but it will soon be evident that the invention is not limited to application to this or any other specific design or kind of scale. The reference numeral 4 designates the sheet metal platform which is of inverted cupped form so as to enclose a base pan 5 also made of sheet metal. 6 is a dial housing provided in the longitudinal median plane of the platform so as to leave ample foot room on opposite sides thereof. 7 is a wishbone lever having a rear forked portion 8 and a forwardly reaching arm 9. The forked portion 8 provides laterally spaced fulcrums 10 on the rear end thereof adapted to rest on upwardly projecting legs 11 provided on the base 5, and there are outwardly projecting fulcrums 12 on both branches of the forked portion 8 in forwardly spaced relation to the fulcrums 10 for support of the downwardly reaching legs 13 provided on the platform 4. Two secondary levers 14 disposed longitudinally, one on each side of the forwardly reaching arm 9, in accordance with the copending application, are equipped with swingable bearings 15 and 16 at opposite ends for support of said secondary levers at their front ends on upwardly projecting legs 17 provided on the base and support of the rear ends of said levers on laterally reaching projections 18 on the forked portion 8 of the lever 7. Another swingable bearing 19 is mounted on each of the secondary levers 14 intermediate the ends thereof and serves to support the platform 4 by engagement with the downwardly projecting legs 20 thereof.

The arm 9 on the main lever 7, in accordance with my invention, carries one of two permanent horseshoe magnets 21 and 22, the other being supported on the base 5. Both magnets have a flat surface 23 provided at the center of the arch thereof, this flat surface in the case of the magnet 22 facilitating the vertical positioning thereof on the base 5 to which the magnet is fastened by rivets 24. A downwardly projecting transverse rib 5a formed on the base 5 with its bottom surface in the same plane with the floor engaging feet 5b, which are also in the form of downwardly projecting ribs struck from the sheet metal of the base 5, serves to prevent deflection of the sheet metal of the base 5 under the thrust imposed upon the magnet 22 when someone stands on the platform 4. Rivets 25 fasten the magnet 21 to the end of the arm 9, the latter having the top thereof rounded, as at 26, to conform to the inside curvature of the magnet 21. The magnets 21 and 22 are disposed with like poles facing one another, as indicated by the letters N—N and S—S in Fig. 3, whereby to utilize their repulsion force for counterbalancing purposes. This force varies directly as the square of the distance between the magnets, and therefore when the platform 4 is unloaded, the arm 9 is held raised by means of the magnet 21 which is disposed in floating relation to the magnet 22 under a predetermined repulsion force. Then, when weight is placed on the platform, a new balance is established with the magnet 21 disposed in closer relation to the magnet 22, the closeness, of course, depending upon the weight applied. The opposing pole faces $b$ and $c$ are preferably in planes passing through closely spaced parallel horizontal axes $a$ and $a'$, the axis $a$ being that about which the lever 7 and its arm 9 moves, whereby to have the pole faces in substantial parallelism, especially when the scale platform is loaded and said pole faces are brought closer together. A dial 27 rotatably mounted on the platform 4 on a spindle 28 so as to project up into the housing 6 into close proximity with the window 29 carries weight graduations on the periphery thereof. The dial is arranged to be rotated in proportion to the amount of deflection under load of the arm 9 with respect to the platform, and for that purpose a rack 30 is provided which rests at its lower end on the transverse knife-edge 31 on the arm 9 and gravitates as the arm is forced downwardly under the application of weight on the platform, thereby turning the dial 27 by means of the pinion 32 which meshes with the rack. A hair-line 33 on the window 29 cooperates with the dial graduations in reading the weight.

I prefer to employ the new nickel-aluminum-cobalt-iron permanent magnet alloy for the magnets 21 and 22, because this material has been demonstrated to have a higher permanency factor than other magnetic materials, a characteristic which maintains meter accuracy over a long period of time. Then, too, that material permits reduction in size and weight of the magnets. The material also has the advantage of being more easily machined, although, of course, the magnets herein disclosed will most likely be cast to the final shape desired. A further advantage of this material is its corrosion resisting properties.

It is believed the foregoing description conveys a good understanding of the objects and advantages of my invention. The appended claims have been drawn with a view to covering all legitimate modifications and adaptations.

I claim:

1. In a weighing scale, a base, a platform movably supported thereon on force reducing lever mechanism, and two magnets disposed with the end faces of like poles in closely spaced relation so that their magnetic fields oppose one another, the one magnet being fixed relative to the base and the other magnet being movable with the lever mechanism toward the first magnet in the loading of said platform, whereby said magnets mutually restrain movement of said lever mechanism by the force of repulsion.

2. In a weighing scale, a base, a platform movably supported thereon on force reducing lever mechanism, a stationary magnet mounted on the base, and another magnet longitudinally aligned with the first-mentioned magnet and movable with the lever mechanism toward and away from said first-mentioned magnet, said magnets being disposed with their pole faces in varying closely spaced relation throughout the range of movement of said lever mechanism, whereby the movable magnet remains influenced by the magnetic field of the stationary magnet in all operative positions and said magnets mutually exert a force serving to resist movement of said lever mechanism under load placed on the platform.

3. In a weighing scale, a base, a platform movable with respect thereto and supported on force reducing fulcrum levers carried on the base, a permanent horseshoe magnet supported on the base, and a permanent horseshoe magnet mounted on one of said levers in substantially coplanar relation with the first-mentioned magnet for movement of its poles in a vertical plane toward and away from the poles of said first-mentioned magnet, said magnets having related poles opposed in closely spaced relationship, each within the magnetic field of the other, whereby said magnets provide the counterbalancing force for said scale restraining movement of the levers thereof.

4. In a weighing scale, a base, a platform movable with respect thereto and supported on force reducing fulcrum levers carried on the base, a permanent horseshoe magnet mounted on said base and projecting upwardly therefrom, and a companion permanent horseshoe magnet mounted on one of said levers in vertical substantially coplanar alignment with and projecting downwardly toward said first magnet, said magnets having like poles in alignment whereby to exert a repulsion force to counterbalance the scale and restrain movement of said levers.

5. A scale as set forth in claim 4, wherein said first-mentioned magnet has a flat surface provided at the middle of the arch thereof for engagement with a flat horizontal surface provided on said base, there being means for rigidly securing said magnet to said base in such position, whereby the pole portions extend substantially vertically from said base.

6. A scale as set forth in claim 4, wherein said base is of sheet metal and is formed to provide a downwardly projecting rib portion under the magnet supported thereon for engagement with the floor on which the scale rests to prevent deflection of the sheet metal of said base when the platform is loaded.

7. A scale as set forth in claim 4, wherein the pole face of the second magnet is in a radial plane passing through the axis about which the lever on which said magnet is carried is movable, the other magnet having its pole face in a substantially coincident plane.

8. A scale as set forth in claim 4, wherein the pole face of the second magnet is in a radial plane passing through the axis about which the lever on which said magnet is carried is movable, the other magnet having its pole face in a radial plane passing through an axis parallel to the first axis and in closely spaced relation thereto, substantially as and for the purpose described.

9. A scale as set forth in claim 4, wherein the scale base is of sheet metal formed to provide downwardly projecting feet reaching to a common plane, and wherein said base is further formed to provide under the magnet supported thereon another downwardly projecting portion reaching to the same plane aforesaid, substantially as and for the purpose described.

JOHN C. SUTTON.